United States Patent
March

(10) Patent No.: US 12,182,429 B2
(45) Date of Patent: Dec. 31, 2024

(54) HIERARCHICAL FILE BLOCK VARIANT TRACKING FOR PERFORMANCE IN PARALLELISM AT MULTI-DISK ARRAYS

(71) Applicant: IC MANAGE INC, Campbell, CA (US)

(72) Inventor: Roger March, Santa Clara, CA (US)

(73) Assignee: IC Manage, Inc., Campbell, CA (US)

( * ) Notice: Subject to any disclaimer, the term of this patent is extended or adjusted under 35 U.S.C. 154(b) by 0 days.

(21) Appl. No.: 17/354,247

(22) Filed: Jun. 22, 2021

(65) Prior Publication Data

US 2022/0100374 A1      Mar. 31, 2022

Related U.S. Application Data

(63) Continuation-in-part of application No. 16/361,729, filed on Mar. 22, 2019, now abandoned, which is a continuation-in-part of application No. 15/242,364, filed on Aug. 19, 2016, now abandoned.

(51) Int. Cl.
*G06F 3/06* (2006.01)

(52) U.S. Cl.
CPC ............ *G06F 3/064* (2013.01); *G06F 3/0605* (2013.01); *G06F 3/0644* (2013.01); *G06F 3/0659* (2013.01); *G06F 3/067* (2013.01); *G06F 3/0689* (2013.01)

(58) Field of Classification Search
CPC ...... G06F 3/064; G06F 3/0605; G06F 3/0644; G06F 3/0659; G06F 3/067; G06F 3/0689
See application file for complete search history.

(56) References Cited

U.S. PATENT DOCUMENTS

| | | | | |
|---|---|---|---|---|
| 5,889,935 A | * | 3/1999 | Ofek | G06F 11/2071 709/217 |
| 10,467,156 B1 | * | 11/2019 | Iyer | G06F 13/4282 |
| 2007/0220200 A1 | * | 9/2007 | Gill | G06F 12/0868 711/E12.072 |
| 2011/0307449 A1 | * | 12/2011 | Cargille | G06F 11/1435 707/648 |
| 2014/0006465 A1 | * | 1/2014 | Davis | G06F 16/1752 707/827 |

* cited by examiner

*Primary Examiner* — Nanci N Wong

(57) ABSTRACT

A computer implemented method implemented by at least one processor performing executable instructions improves the performance of multi-disk arrays by aggregating several file block variant commitments into a fewer number of parallel file write operations. Using the method, a system and apparatus intermediates between a central file service and distributed virtual machine data center servers. Requests for file block variants are redirected to the location of the freshest retention. Each data center has a non-transitory file block variant store locally attached. Each file block librarian provides a file system view to each virtual machine. Several Virtual Machine Data Centers are coordinated by a tracker which locates, redirects, and retrieves any file block variant within its name space or a name subspace delegated to a librarian. A threshold of parallelism related to dimensions of a multi-disk array determines scheduling of write operations.

5 Claims, 20 Drawing Sheets

2000

```
receiving, from a processor core, a plurality of file block variant commit
request indicia into non-transitory media (store) for various file extents
of a version controlled file 2010
                              │
                              ▼
storing said plurality of file extents until a threshold of parallelism is
exceeded 2020
                              │
                              ▼
transmitting an acknowledge indicia for a file commit to a sender of file
block variant commit request 2030
                              │
                              ▼
incrementing the number of file block variant commit request indicia yet
unfulfilled for the version controlled file (C) 2040
                              │
                              ▼
comparing C to a threshold 2050
                              │
                              ▼
upon exceeding said threshold of C (unfulfilled file block variant
commit requests), triggering a file write operation for all stored file
extents of the version controlled file into a remote multi-disk non-
transitory media (remote store) 2060
                              │
                              ▼
reinitializing C the number of received file block variant commit request
indicia 2070
```

FIG 20

HIERARCHICAL FILE BLOCK VARIANT TRACKING FOR PERFORMANCE IN PARALLELISM AT MULTI-DISK ARRAYS

CROSS-REFERENCE TO RELATED APPLICATIONS

This is a CONTINUATION IN PART application of currently pending Ser. No. 16/361,729 "Hierarchical File Block Variant Tracking for Performance in Parallelism at Multi-Disk Arrays" filing date Mar. 22, 2019; which is a CONTINUATION IN PART of Ser. No. 15/242,364 filed Aug. 19, 2016 "Hierarchical file block variant tracker apparatus coupled to a Librarian and to a remote file service" in turn a continuation in part of Ser. No. 14/266,830 filed May 1, 2014, in turn, a continuation in part application of Ser. No. 14/138,663 filed Dec. 23, 2013 which is incorporated in its entirety by reference and claims the priority thereof.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The field of the invention is within Electrical Computers and Digital Processing Systems: Memory, appropriate subclasses for accessing, controlling, storing or writing to, retrieving or reading from memories that are peripherals.

It is known that each one of many networked user workstation apparatuses may commit a file into the variant controlled file system by storing aversion tracking record for each change log and content point for each block of the file into its local file system view store, and transmitting aversion tracking record to a network attached file state ledgerdemain store. Each user workstation displays a file system view of every variant of every file in the file system for selection. When required, the workstation applies change logs to content points according to first a local file system view store for a version tracking record, then requesting and comparing version tracking records from confederated repositories at other user workstation apparatuses, and if unsatisfied, obtains a version tracking record from a network attached file state ledgerdemain store. Even so, congestion has been observed when files are written to a centralized file server or service. Within this application, a file block variant is meant as a version controlled file block of a file.

Several versions of the same file block (i.e. variants) may be simultaneously in use across multiple data centers and two distinct versions of the same file block may be written.

It is known that modern file systems provide high throughput by parallelism to essentially fulfill multiple file block operations in the same wall clock time as fulfilling a single file block operation when the blocks are in the same file. It is known that modern data centers utilize servers having multi-core processor by restoring a virtual machine operating system in each core, instantiating an application (app) in each virtual machine (vm), and provisioning file blocks necessary for performing a task, transaction, transformation, or verification. At the conclusion of the application instance, the resulting output is retained and the intermediate results and state of the virtual machine and application are discarded to enable a clean processor core and memory space for the next vm and app instantiation.

It is appreciated that because the data input and output operations across a group of processor cores is asynchronous based on their availability after completion of a previous task, the file block operations seem random and degrades the performance of a file system far below optimum. Thus, it can be appreciated that what is needed is quicker provisioning of an operating system and an application into each of a plurality of processor cores; unrestricted accessibility to versioned file block assets between any processor resource and any storage resource; and rapid release and sterilization of resources when a task is accomplished. Further, multi-disk arrays offer opportunities for improved efficiency due to parallelism.

SUMMARY OF THE INVENTION

A computer implemented method causes a processor to operate as a tracker apparatus which reads and writes one or more file block variants of a file to or from a remote file system on behalf of several file block librarian (librarian) circuits. The tracker keeps a record of where the fulfilled file block variant requests reside among the librarian circuits. Requests for a file block are redirected to a librarian which has a specific version. The tracker provides a file commit acknowledgement when a virtual machine requires it to release its resources. The tracker controls ownership of a name space but may delegate a name subspace to a librarian.

Another computer implemented method causes a processor to operate as a librarian apparatus which serves a virtual machine data center by presenting a file system view to each virtual machine. Each virtual machine controlling a processor core reads and writes file block variants to the librarian through interprocess communication (IPC). The librarian is coupled to a non-transitory data center file block store which has all the versions written by its virtual machines. Each librarian may obtain an other version of a file block from a peer librarian which is coupled to another file block store. Only when a librarian cannot locate a desired file block variant among its peer librarians, does a read request go to its tracker. When a virtual machine commits a file, the write request goes both to the tracker and to the local file block store. The virtual machine is released upon receipt from the tracker of a file block write acknowledgement.

When a virtual machine controlling a processor core completes its assignment and receives a file block write acknowledgement from the tracker, all its intermediate files, vm state, and application state are discarded to enable a clean restore into its processor core and allocated memory. The virtual machine operating system image and application image is instantiated from the local file block store for its next assignment. A system and apparatus intermediates between a centralized remote file service and several distributed virtual machine data center servers. A centralized file server or cluster of servers may provide services as a cloud to distributed data centers by a wide area network.

When several file block variants are committed by applications running in virtual machines, they are aggregated together by the invention into a fewer number of file write operations to exploit the parallelism of multi-disk arrays. The file blocks may come from diverse data center locations. It improves efficiency to aggregate file block variant writes into a smaller number of file writes at the centralized file server(s). An application within a virtual machine may be released without risk of data loss as soon as the commitment has been acknowledged. The tracker has non-transitory storage to ensure that data will not be lost during aggregation.

Requests for frequently retrieved file block variants are redirected to the location of the freshest retention. When the tracker receives and distributes a requested file block variant, it stores the location for use by another librarian.

A computer implemented method of operation presents a file system view to each virtual machine so that it may operate on any version of any file block. Each librarian has a record of the blocks in a file stored at its local file block store, the central file server, and at other librarians. Each virtual machine may modify these blocks in its own file system view without committing to the central file server.

Each data center has a non-transitory file block store locally attached which provides images of virtual machines, applications, and data. When a virtual machine completes its assignment, its processor core and allocated memory are restored with fresh images.

Each virtual machine data center has a file block librarian which provides a file system view to each new virtual machine. In embodiments, the librarian circuits are implemented by executing instructions in one of the virtual machine data center processor cores.

Several Virtual Machine Data Centers are coordinated by a tracker which manages all the assets in a name space. A tracker locates, redirects, and retrieves any file block within its name space. In embodiments, the tracker circuit has its own non-transitory storage and a processor executing instructions to perform a method.

BRIEF DESCRIPTION OF THE SEVERAL VIEWS OF THE DRAWINGS

The present invention will be understood more fully from the detailed description given below and from the accompanying drawings of various embodiments of the invention, which, however, should not be taken to limit the invention to the specific embodiments, but are for explanation and understanding only.

To further clarify the above and other advantages and features of the present invention, a more particular description of the invention will be rendered by reference to specific embodiments thereof which are illustrated in the appended drawings.

FIG. 20 is a flowchart of method processes to aggregate file block commits into a larger file write operation upon meeting a goal of parallelism.

DETAILED DESCRIPTION OF THE INVENTION

Figure 1:
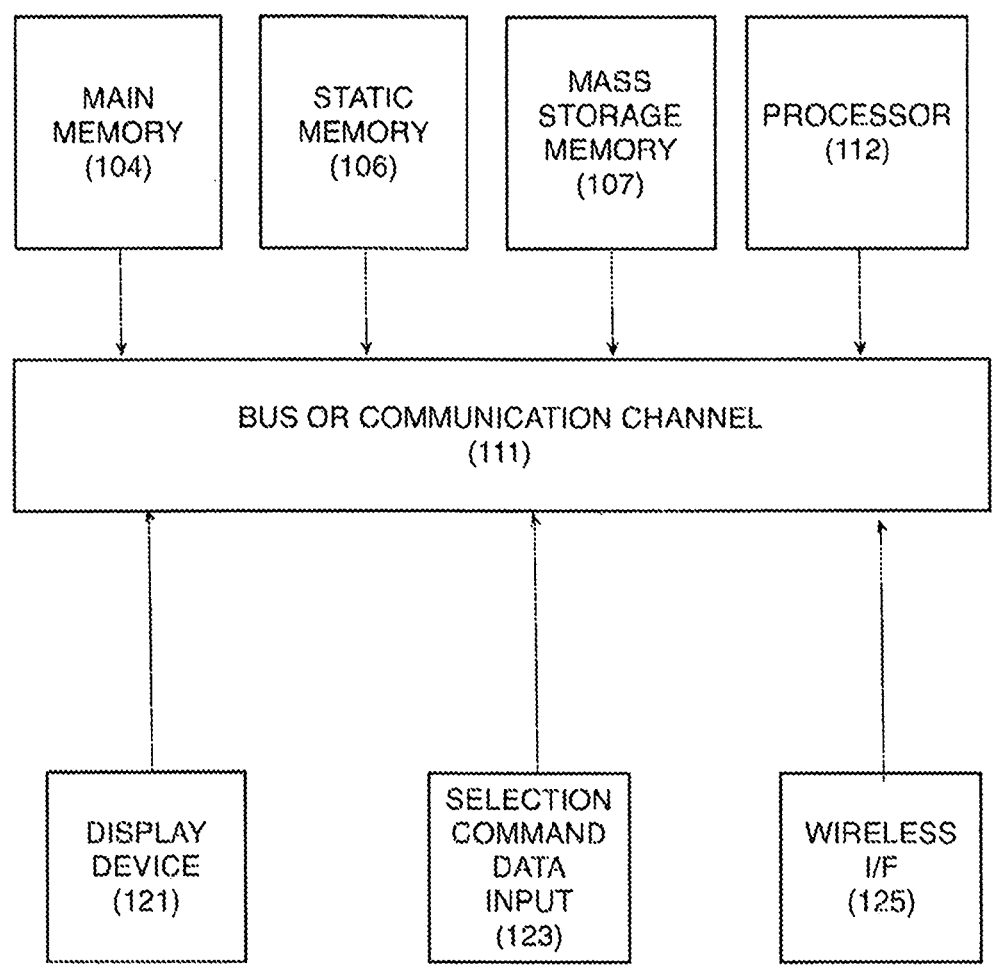
FIG. 1 is a block diagram of an exemplary computer system.

One aspect of the invention is a virtual machine data center system comprising a first Data Center File Block Librarian circuit coupled to a non-transitory Data Center File Block Store wherein the Librarian circuit is a processor core configured to present a File System View to a Virtual Machine of a Virtual Machine server.

In an embodiment, the virtual machine data center system further has at least one virtual machine server which has a plurality of processor cores coupled to a shared random access memory store for data and instructions of virtual machines and applications.

In an embodiment, the virtual machine data center system is attached to a second virtual machine data center which has a second Data Center File Block Librarian circuit coupled to a second non-transitory Data Center File Block Store. Therefore, the File System View of the first Librarian displays the file blocks and locations of file blocks in both non-transitory Data File Block Stores.

Another aspect of the invention is a file block tracker (Tracker)apparatus communicatively coupled to a plurality of librarian circuits (Librarians) and communicatively coupled to a remote file service. In this aspect, the Tracker contains a buffer circuit to accumulate file block commits from one or more Librarians, a synch/semi-synch circuit to acknowledge file block commits from each Librarian, a file read/write circuit to request read and write operations of a plurality of file blocks of a file at the remote file service, a name space management circuit to locate file blocks in any attached Librarian or the remote file service, and a subspace delegation circuit to redirect queries from a first Librarian to a second Librarian.

Another aspect of the invention is a data center system having a first Data Center File Block Librarian (Librarian) circuit; coupled to a non-transitory Data Center File Block (DCFB) Store, wherein the Librarian circuit is a processor core configured to present a File System View (FSV) to a server.

In an embodiment the data center system also has at least one server with a plurality of processor cores; coupled to a shared random access memory store for data and instructions.

In an embodiment, the first data center system is coupled to a second data center having a second Librarian circuit coupled to a second non-transitory DCFB Store, wherein the File System View of the first Librarian displays the file blocks and locations of file blocks in both a first and a second non-transitory DCFB Stores.

Another aspect of the invention is a file block tracker (Tracker) apparatus communicatively coupled to a plurality of Librarian circuits and communicatively coupled to a remote file service, the Tracker having at least a buffer circuit to accumulate file block commits from one or more Librarian circuits; a synch/semi-synch circuit to acknowledge file block commits from each Librarian circuit; a file read/write circuit to request read and write operations of a plurality of file blocks of a file at the remote file service; a subspace name space management circuit to locate file blocks in any attached Librarian circuit or the remote file service; and a subspace delegation circuit to redirect queries from a first Librarian circuit to a second Librarian circuit.

Figure 2:
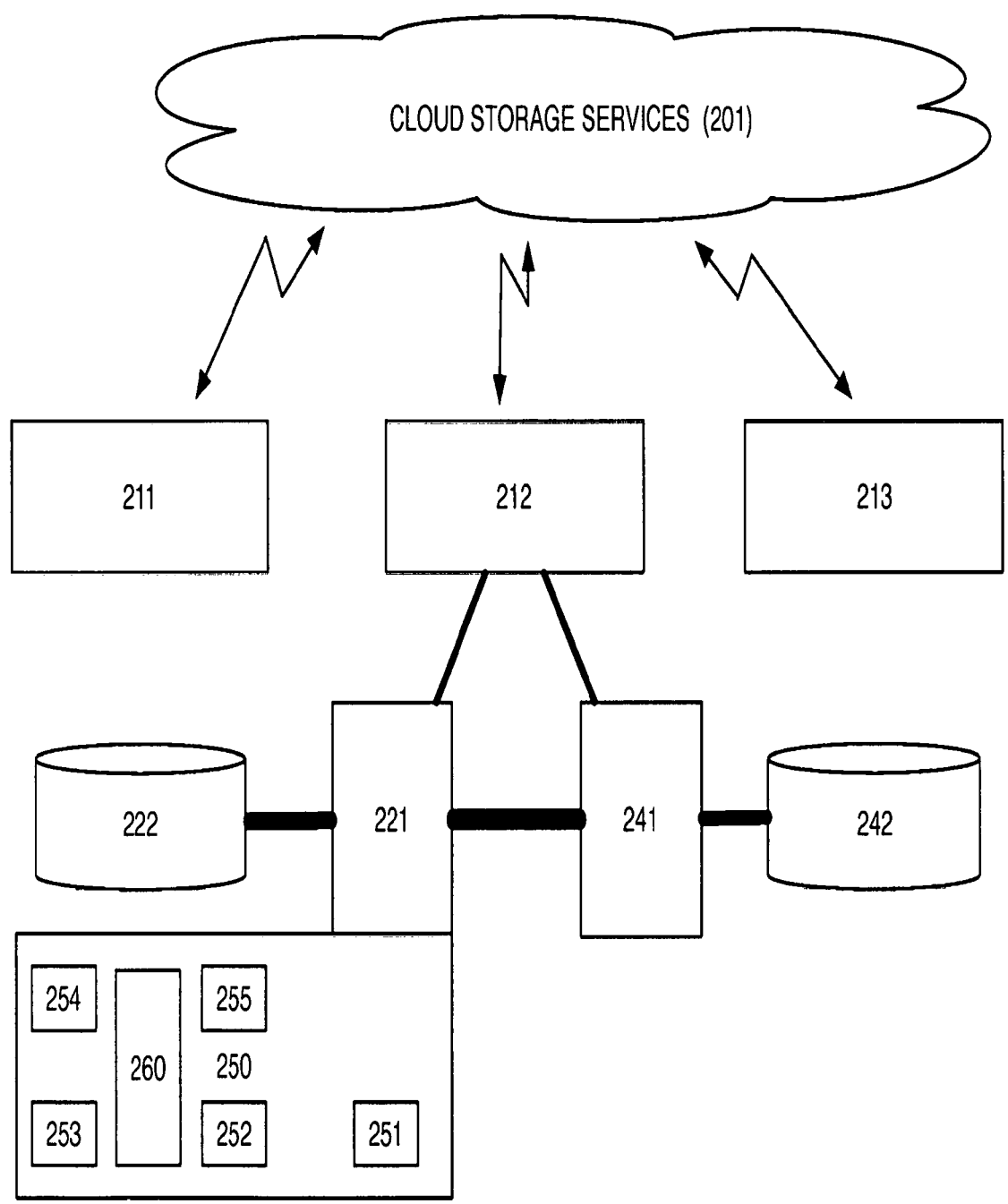
FIG. 2 is a block diagram of a system with data flows.

Referring now to FIG. 2, a block diagram of a system with data flows among components is shown. File Block Trackers 211-213 are communicatively coupled by a wide area network to Cloud Storage Services 201, which utilize any modern file system server. Each File Block Tracker is lord of a namespace which is available to a plurality of Peer Managers aka File Block Librarians 221, 241 which are well interconnected.

Each File Block Librarian has a locally attached File Block Store 222, 242. A virtual machine data center 250 has storage 260 and a plurality of processor cores 251-255. Virtual Machine Images and User Application Images are stored in a local File Block Store 222 and provisioned to a core 251 when a virtual machine data center 250 allocates a core and storage 260 to a virtual machine. The File Block Librarian also provisions, through a data frame, a file system viewport personalized to the virtual machine instance. By lord of a namespace, this application defines it as authoritative in variant control.

Figure 3:
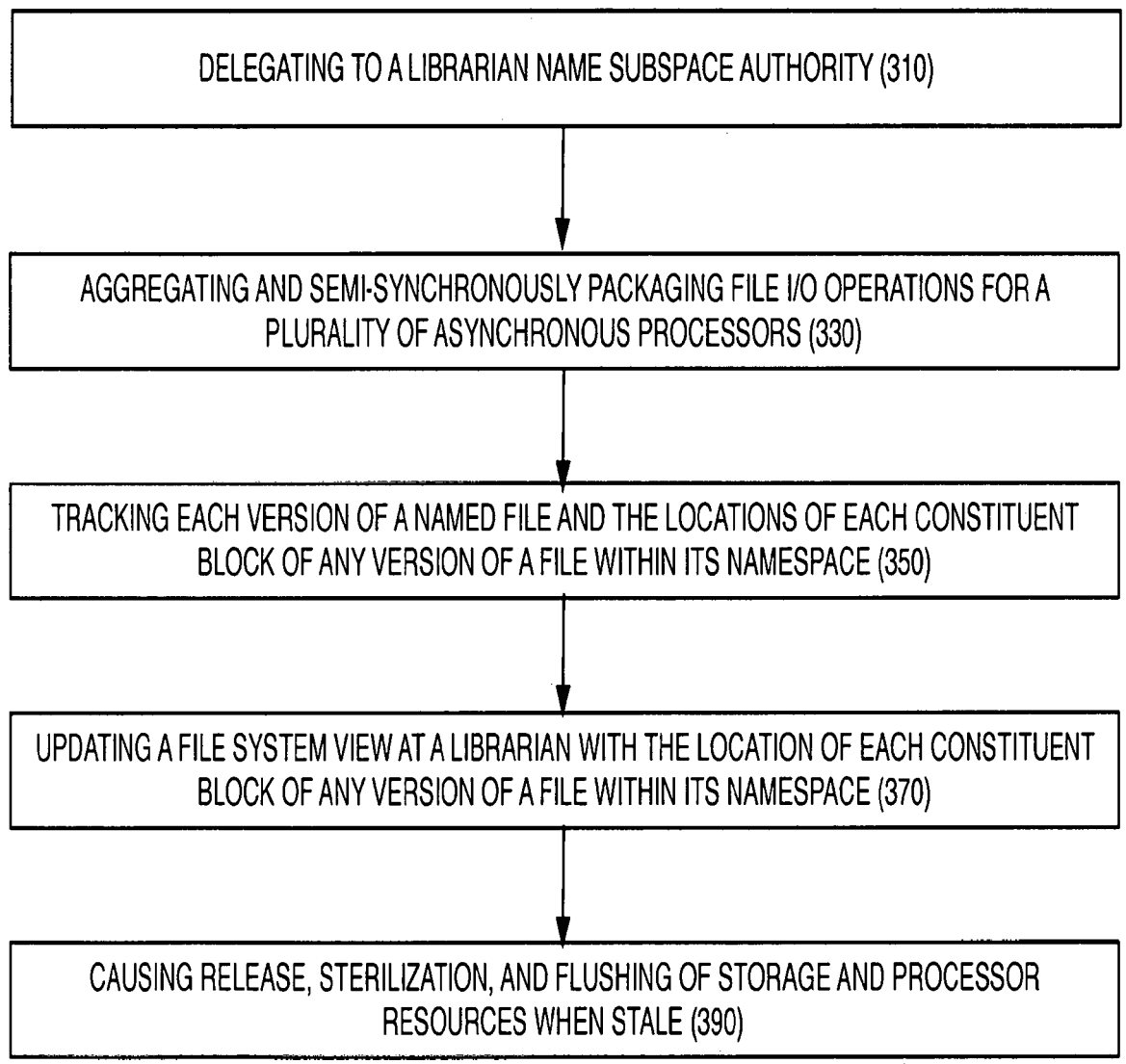
FIGS. 3-8 are flowcharts of method steps.

Another aspect of the invention is a method of operation for a file block tracker apparatus FIG. 3 by execution of instructions by a processor to perform: delegating to a librarian name subspace authority (310); aggregating and semi-synchronously packaging file 1/0 operations for a plurality of asynchronous processors 330; tracking each version of a named file and the locations of each constituent block of any version of a file within its namespace 350; updating a file system view at a librarian with the location of each constituent block of any version of a file within its namespace 370; and causing release, sterilization, and flushing of storage and processor resources when stale 390.

Figure 4:
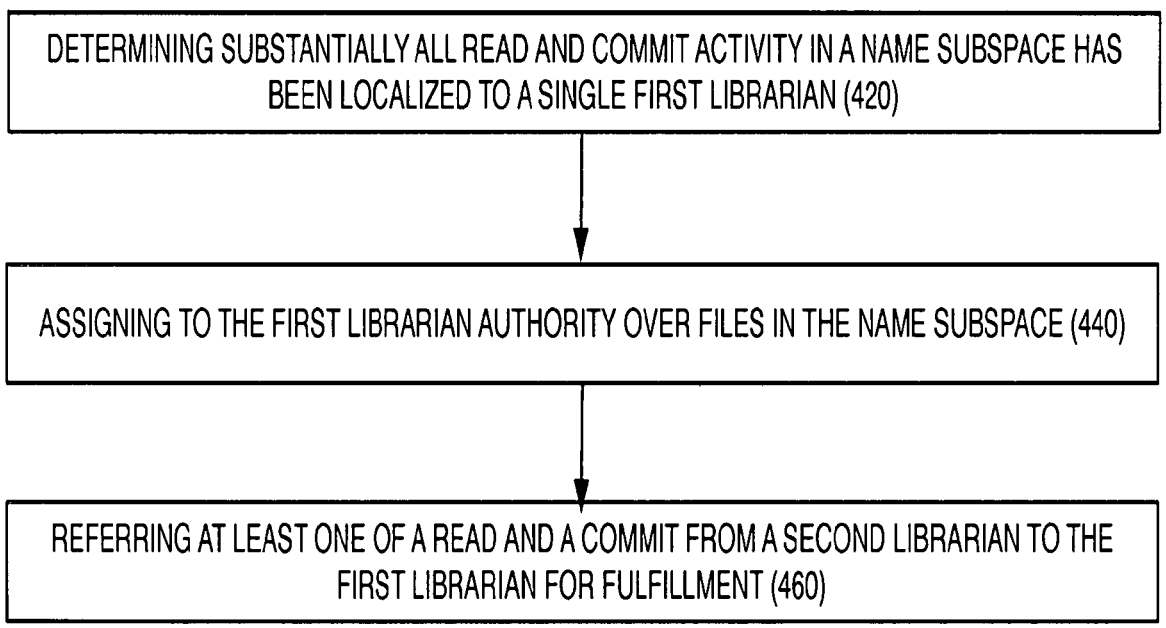

In an embodiment, delegating name subspace authority to a Librarian illustrated in FIG. 4 includes determining that substantially all read and commit activity to a plurality of files in a name subspace in a period has been localized to a single first Librarian 420; assigning to the first Librarian authority over a plurality of files in the name subspace 440; and referring at least one of a read and a commit from a second Librarian to the first Librarian for fulfillment 460.

Figure 5:
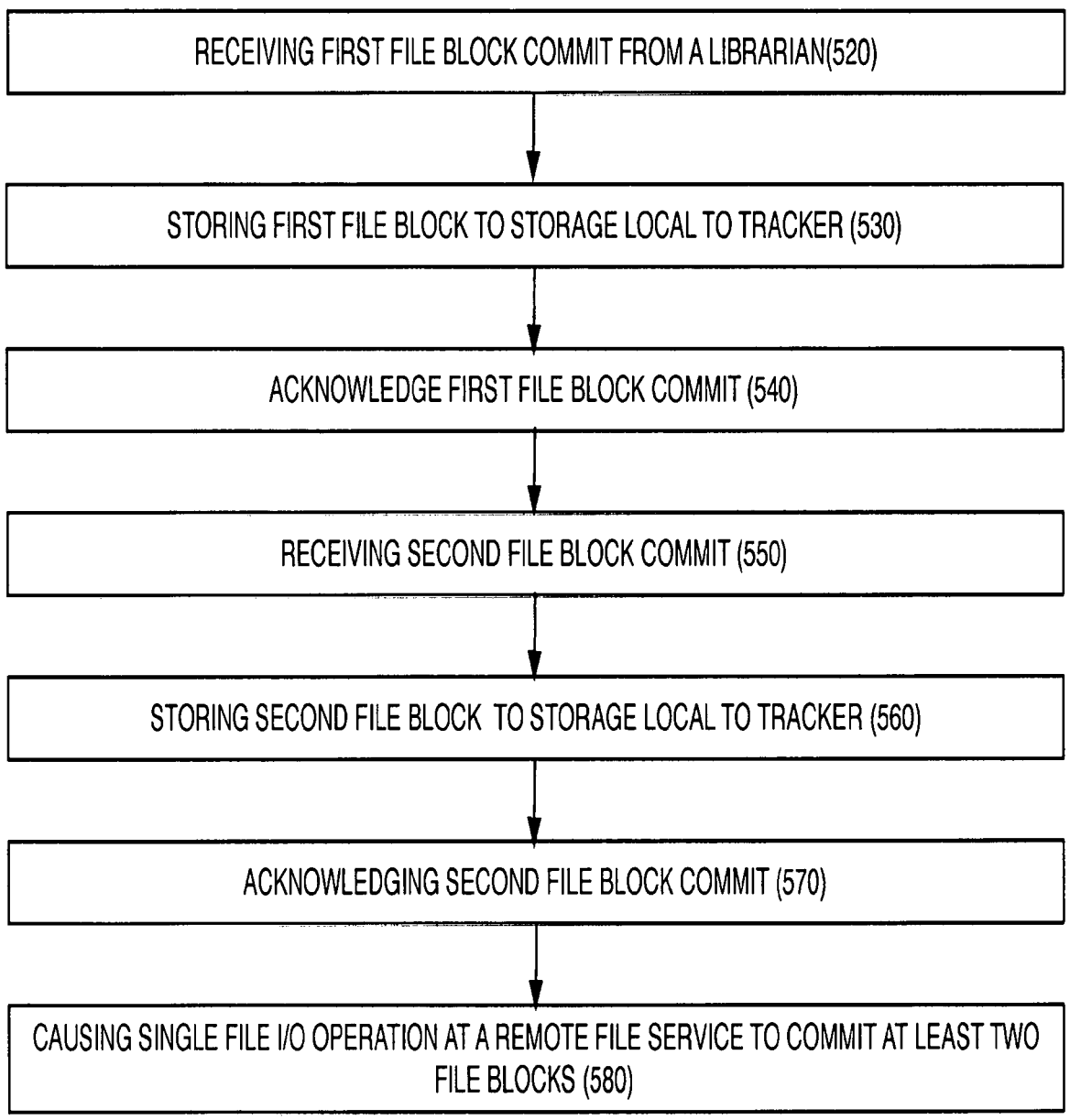

In an embodiment, aggregating and semi-synchronously packaging file 1/0 operations for a plurality of asynchronous processors as illustrated in FIG. 5 includes receiving a first file block commit for a first file from a first Librarian 520; storing the first file block to non-transitory storage local to the Tracker 530; acknowledging the first file block commit to the first Librarian whereby a processor resource is asynchronously released 540; receiving at least one second file block commit for a first file from a Librarian 550; storing the second file block commit to non-transitory storage local to the Tracker 560; acknowledging the second file block commit to the Librarian whereby a processor resource is asynchronously released 570; and causing a file 1/0 operation at a remote file service to commit at least two file blocks of a file 580.

Figure 6:
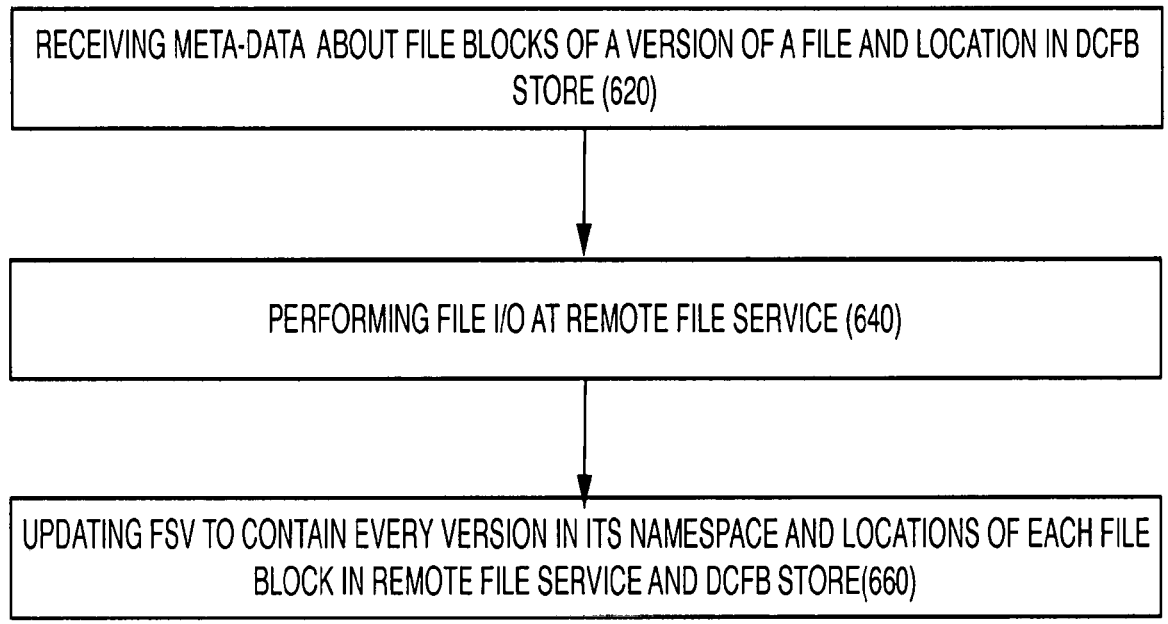

In an embodiment, tracking each version of a named file and the locations of each constituent block of any version of a file within its namespace as illustrated in FIG. 6 includes receiving from a first Librarian meta-data about the constituent file blocks of aversion of a file within its namespace and the location of each constituent file block within a non-transitory DCFB Store 620; performing a file 1/0 operation at a remote file service to store a file block not previously stored in the remote file service 640; updating its file system view to contain every version of a file in its namespace and their constituent file blocks and the location(s) of each constituent file block in at least one of the remote file service and the non-transitory DCFB Store(s) 660.

Figure 7:
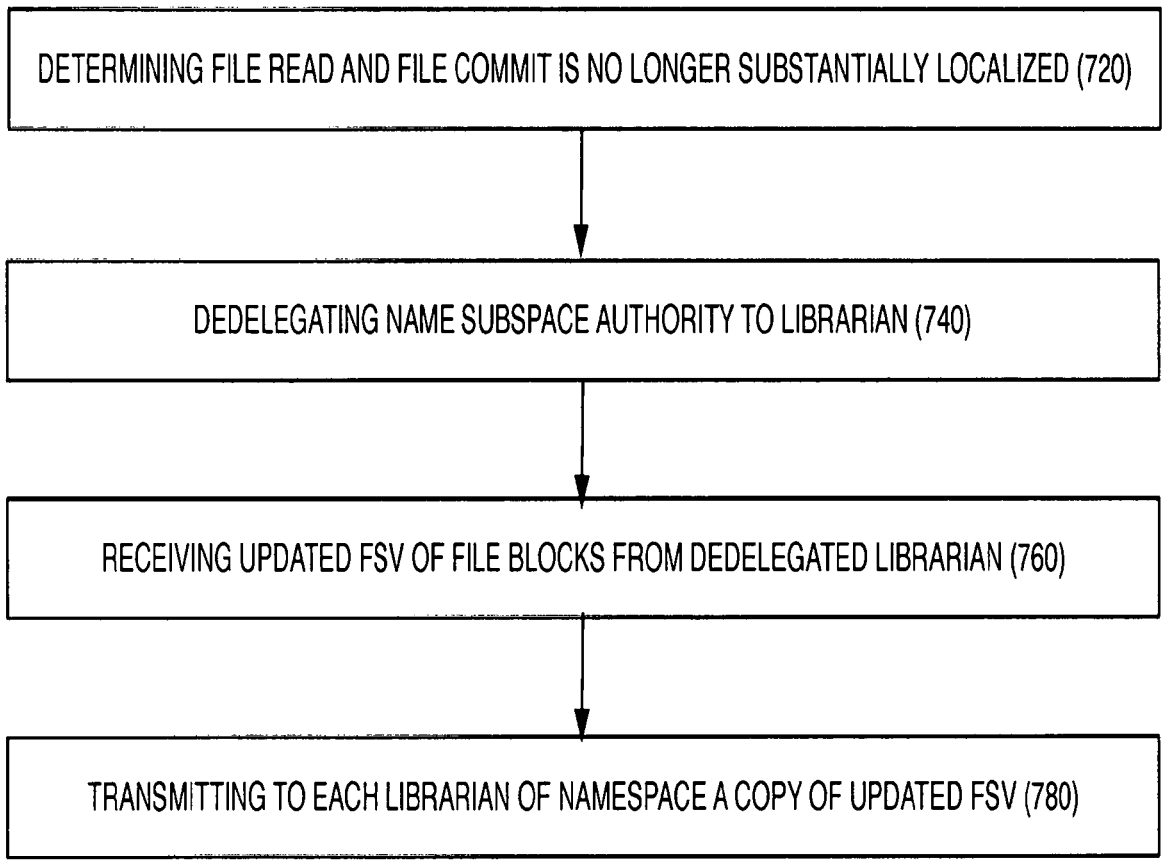

In an embodiment, updating a file system view at a Librarian with the location of each constituent block of any version of a file within its namespace FIG. 7 includes determining that file read and file commit activity for a name subspace is no longer substantially localized to a single Librarian 720; dedelegating name subspace authority to the Librarian 740; receiving an updated file system view containing meta-data describing each version of the files within the subspace and the location of every constituent file block from the dedelegated Librarian 760; and, transmitting to each Librarian of the namespace a copy of the updated file system view 780.

Figure 8:
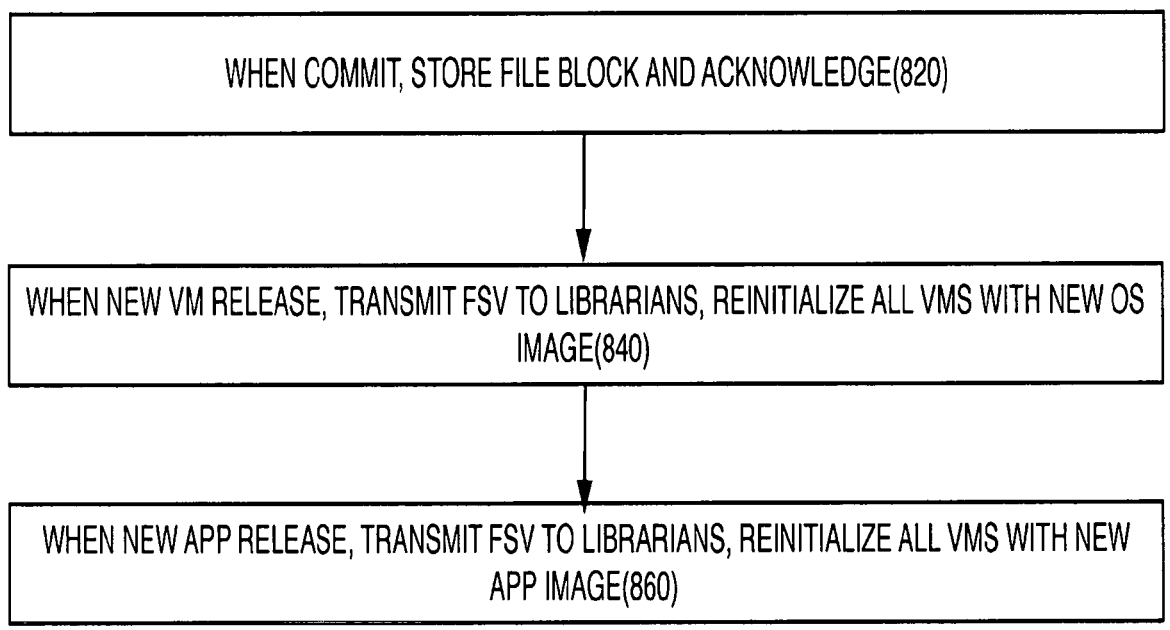

In an embodiment, causing release, sterilization, and flushing of storage and processor resources when stale as illustrated in FIG. 8 includes when a virtual machine process is complete and commits a file into aversion control system, storing the new or modified file block into non-transitory storage and acknowledging the commit to the virtual machine, whereby the virtual machine may terminate, release all resources, and be reinitialized with a fresh image 820; when a virtual machine image has been superseded with a new release, transmitting a file system view to all librarians containing the new virtual machine image of an operating system, and causing all virtual machines to terminate and reinitialize using the new virtual machine image 840; when an application image has been superseded with a new release, transmitting a file system view to all Librarians containing the new image of an application, and causing all virtual machines to terminate and reinitialize using the new application image whereby cores and non-transitory stores of virtual machine data centers are flushed of stale releases of operating systems or applications 860.

Figure 9:
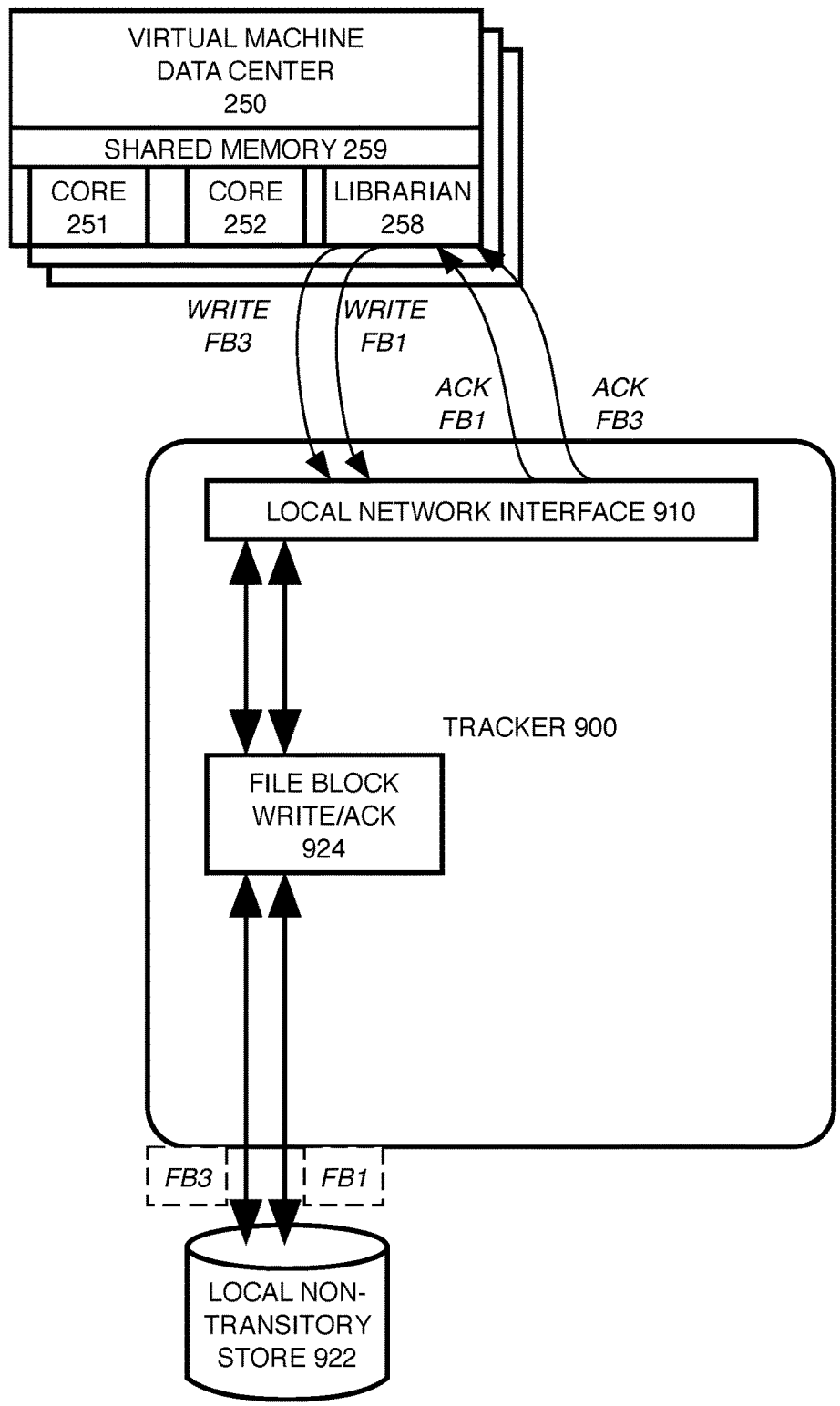
FIG. 9-11 are block diagrams of the apparatus.

Referring now to FIG. 9, a versioned file block location tracker (tracker) apparatus is disclosed. A tracker apparatus 900 comprises a local network interface circuit 910 which is communicatively coupled to a plurality of virtual machine data centers. The local network interface is coupled to a file block write/acknowledge circuit 924. The file block write/acknowledge circuit is coupled to a local non-transitory store 922. In response to a file block write transaction by a librarian of a virtual machine data center, the tracker stores the file block into its local non-transitory store and returns an acknowledgement to the librarian. As a result the virtual machine processor core can be released and refreshed for a new task. The virtual machine processor core is not held in suspension until the file block is written into a remote file server. In addition to all the closely coupled librarians who are notified of the new version of the file block, the tracker also has a record of the version of the file block and its location (not shown). The tracker comprises a local network interface 910, a file block write/acknowledgement circuit 924 coupled to the local network interface, and a local non-transitory store 922 coupled to the file block write/acknowledgement circuit.

Figure 10:
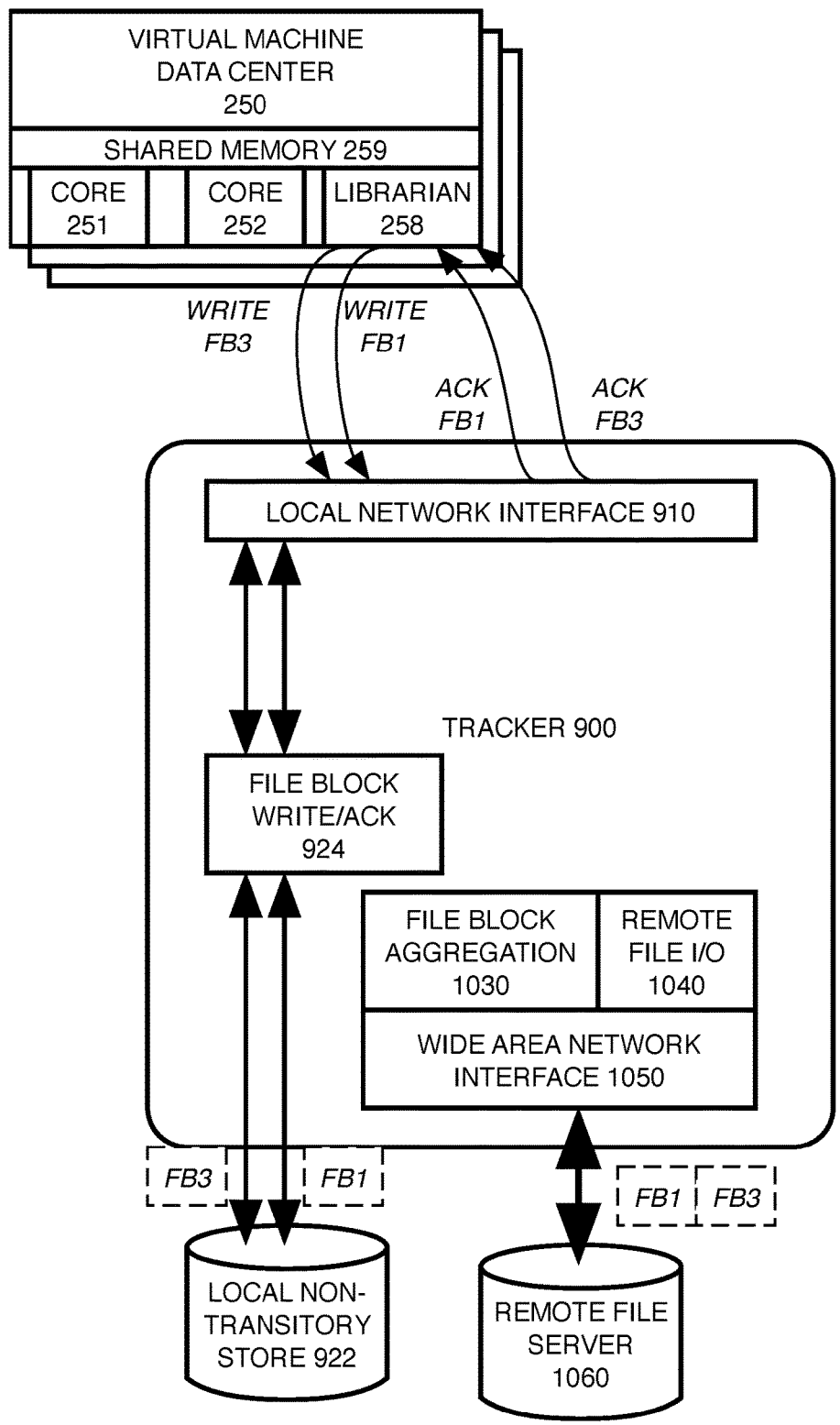

Referring now to FIG. 10, because modern file server system have high parallelism, writing a plurality of file blocks does not take substantially longer than writing a single file block to an array of disks, the tracker further comprises a file block aggregation circuit 1030. A group of file blocks which are unrelated to one another is processed through a remote file 1/0 circuit 1040 which is coupled to the aggregation circuit. The file blocks are written to a remote File Server 1060 by a wide area network interface 1050 which is coupled to the File 1/0 circuit. Potential congestion at the remote file server is reduced by sending a longer packet made up of multiple unrelated file blocks. The tracker further comprises a file block aggregation circuit 1030, a remote file 1/0 circuit 1040 coupled to the aggregation circuit, and a wide area network interface 1050 coupled to the remote file 1/0 circuit.

Figure 11:
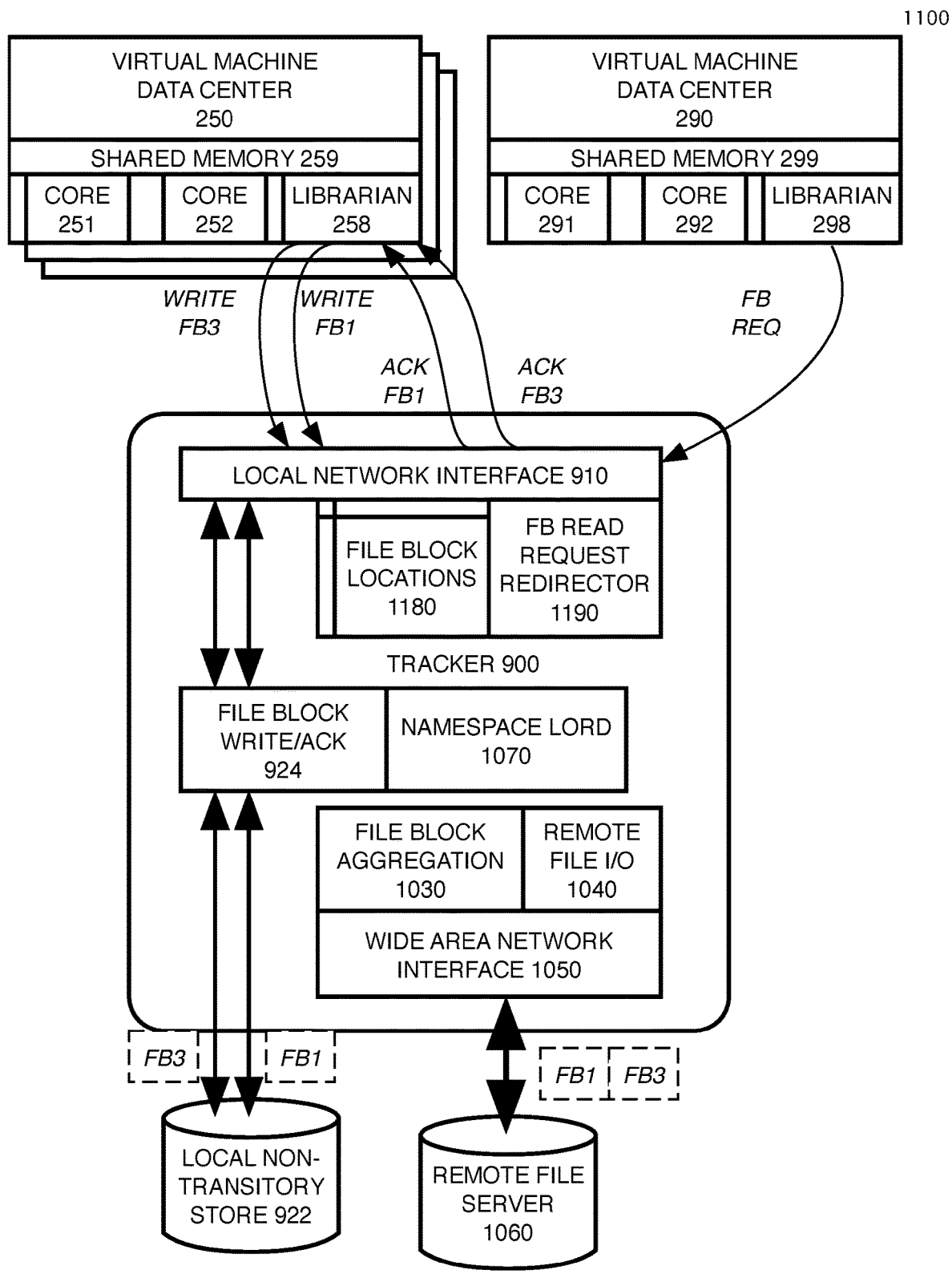

Referring now to FIG. 11, all of the file blocks written by any of the virtual machine data centers are known to the Namespace Lord circuit 1170. All the versions of all of the file blocks are controlled either by the Namespace Lord circuit or by a Librarian delegated to provide this control. A record is managed by the namespace lord 1170 of file block locations 1180 of every version of every file block of every file in the namespace. When a virtual machine of a virtual machine data center is unable to locate a file block using its own librarian or closely connected librarians, the librarian may request the file block from the tracker. A file block read request redirector circuit 1190 receives file block request, checks the file block locations 1180, and forwards the request to a librarian or to the remote file server having the correct version of the correct file. The tracker further comprises a namespace lord circuit 1170 coupled to the file block write/acknowledgement circuit 924 and further coupled to the remote file 1/0 circuit 1040. In an embodiment, file block requests from the remote fileserver are also aggregated. The tracker further comprises a file block locations circuit 1180 coupled to the namespace lord, and a file block read request redirector 1190 coupled to the file block locations circuit. A system and apparatus intermediates between a centralized remote file service and several distributed virtual machine data center servers.

Figure 12:
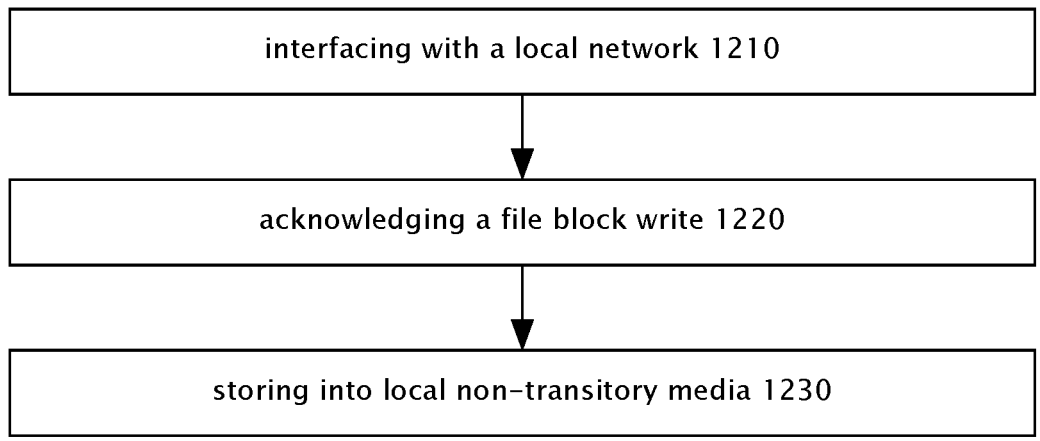
FIG. 12 is a flowchart of tracking versioned file block locations.

Referring now to FIG. 12, a computer implemented method 1200 causes at least one processor to operate as a versioned file block location tracker (tracker) apparatus for intermediation between a plurality of librarian circuits and a remote file server comprises performing as: a local network interface 1210; a file block write/acknowledgement circuit coupled to the local network interface 1220; and a local non-transitory store coupled to the file block write/acknowledgement circuit 1230, whereby throughput of virtual machines attached to the librarian circuits is improved by releasing the resources for reuse as soon as a write acknowledgement is received by the librarian.

Figure 13:
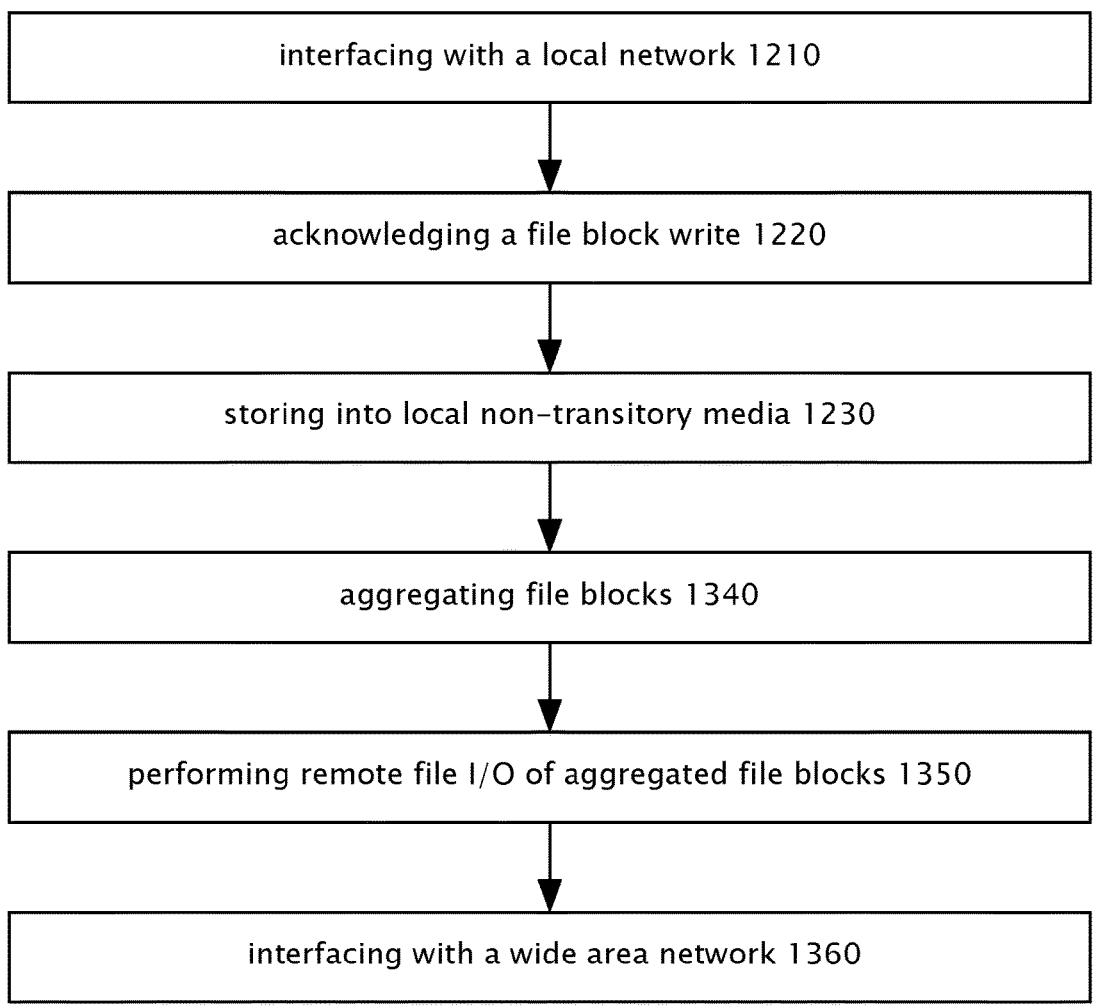
FIG. 13 is a flowchart of processes to aggregate and perform file input and output operations.

Referring now to FIG. 13. The method further comprises performing as: a file block aggregation circuit 1340; a remote file 1/0 circuit; coupled to the aggregation circuit 1350, and a wide area network interface 1360 coupled to the remote file 1/0 circuit, whereby file operations at a remote file server are improved by fewer but larger file reads and writes.

Figure 14:
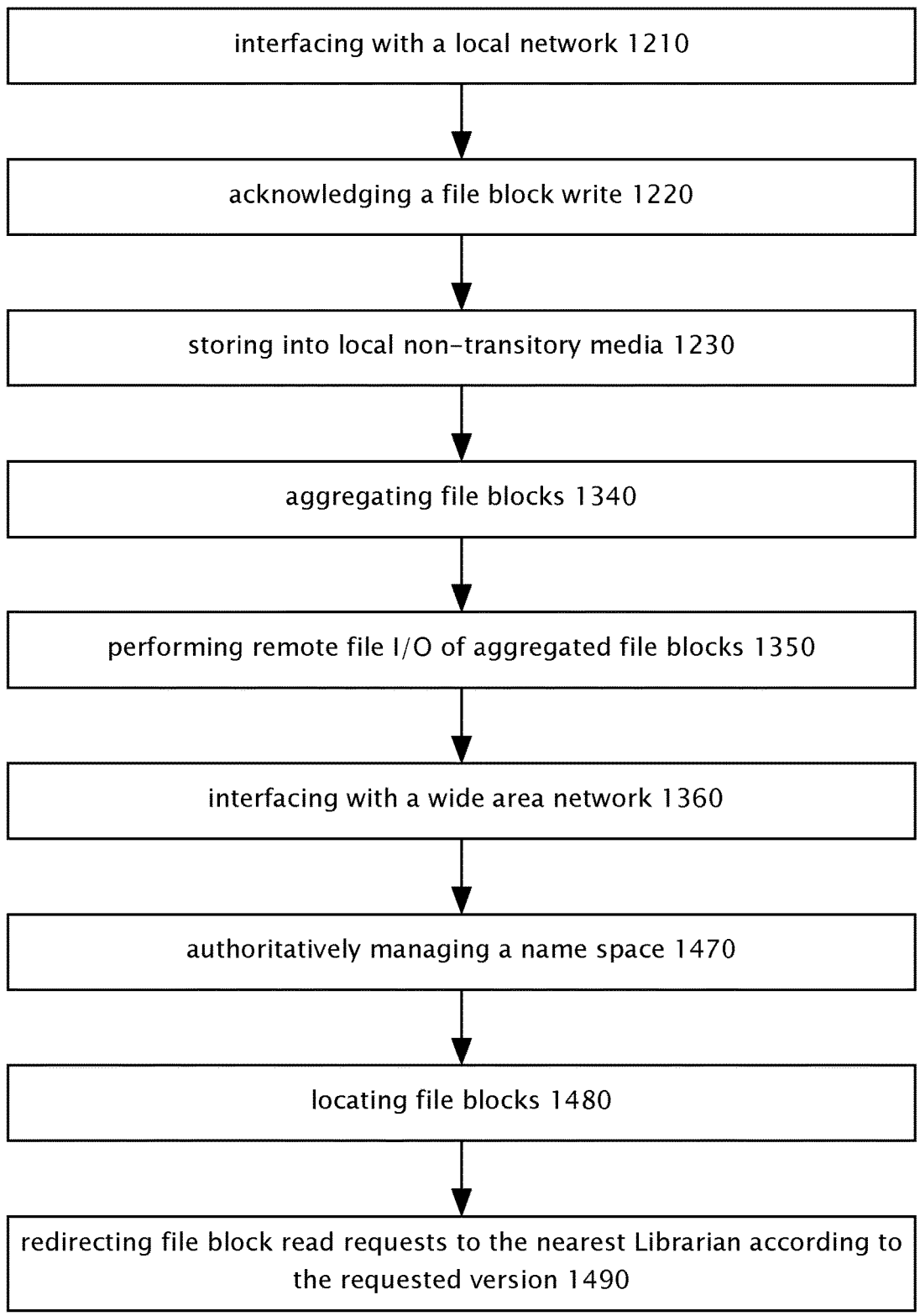
FIG. 14 is a flowchart of processes to perform managing a namespace, acknowledging write requests, redirecting read requests, and locating file blocks by version.

Referring now to FIG. 14. The method further comprises performing as: a namespace lord circuit 1470; coupled to the file block write/acknowledgement circuit and further coupled to the remote file 1/0 circuit, a file block locations circuit 1480; coupled to the namespace lord, and a file block read request redirector 1490 coupled to the file block locations circuit, whereby file block requests are forwarded to the nearest librarian or to the remote file server according to the requested version of the file.

Figure 15:
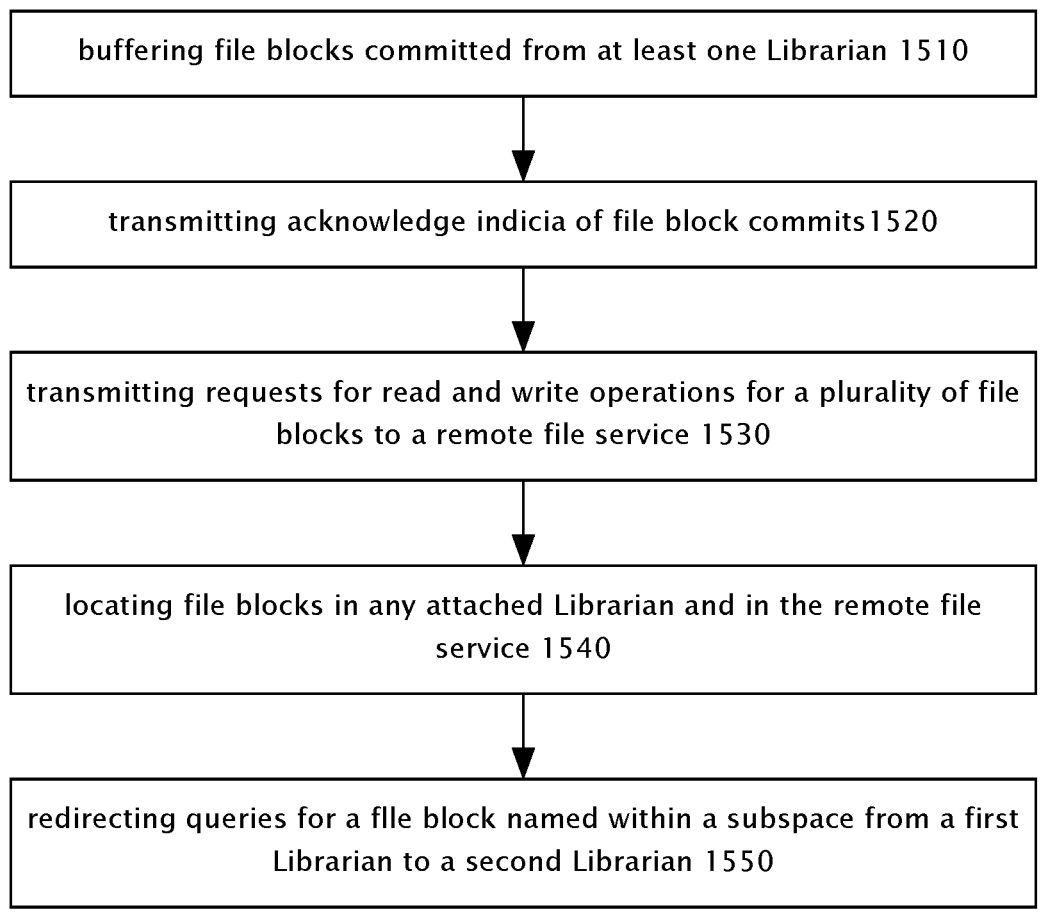
FIG. 15 is a flowchart of processes to perform file block tracking by buffering, accumulating, transmitting acknowledge indicia, transmitting read and write requests, locating file blocks and redirecting queries to another librarian.

Referring now to FIG. 15. A method of operation of a processor performing as a file block tracker (Tracker) apparatus 1500 communicatively coupled to a plurality of Librarian circuits and communicatively coupled to a remote file service, the Tracker comprising performing as: a buffer circuit 1510 communicatively coupled to a plurality of Librarian circuits to accumulate file blocks committed from at least one Librarian circuits; a semi-synch circuit 1520 adapted to transmit acknowledge indicia of file block commits from each Librarian circuit; a file read/write circuit 1530 adapted to transmit a request for read and write operations of a plurality of file blocks of a file to the remote file service; a subspace name space management circuit 1540 to firstly, locate file blocks in any attached Librarian and secondly, when not found, in the remote file service; and a subspace delegation circuit 1550 adapted to redirect queries for a file block named within a subspace from a first Librarian to a second Librarian.

Figure 16:
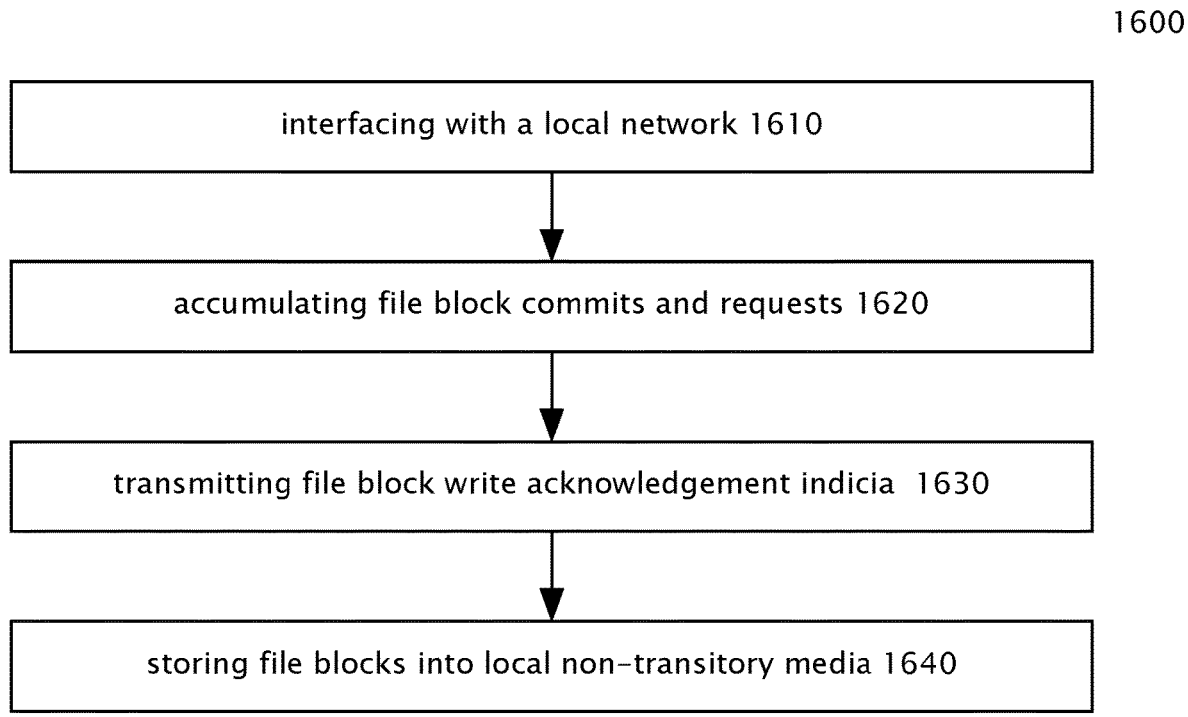
FIG. 16 is a flowchart of method processes to perform versioned file block location tracking.

Referring now to FIG. 16. A method of operation of at least one processor performing as a versioned file block location tracker (tracker) apparatus for intermediation between a plurality of librarian circuits of a virtual machine data center and a remote file server comprises performing as:
  a local network interface 1610; coupled to, a buffer circuit 1620 to accumulate file block commits and file block requests from one or more Librarian circuits; a file block write/acknowledgement circuit 1630 coupled to the local network interface; and a local non-transitory store 1640 coupled to the file block write/acknowledgement circuit, whereby in the event of a failure of a virtual machine data center or its attached storage, loss of current versions of data is minimized.

Figure 17:
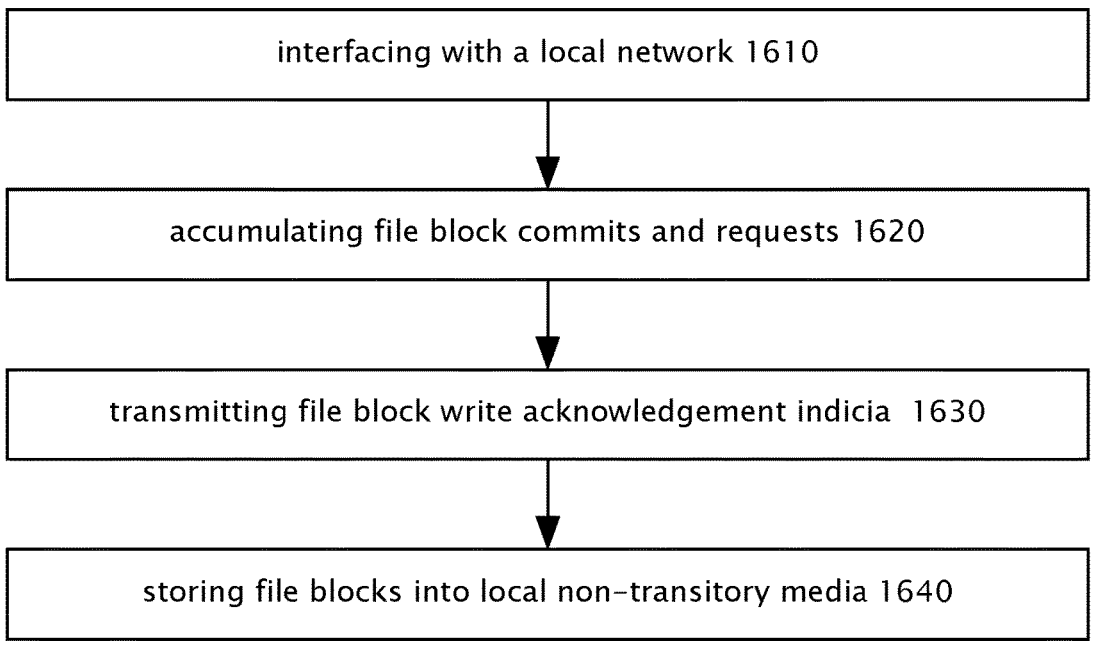
FIG. 17 is a flowchart of method processes to aggregate smaller file operations into fewer but larger file reads and writes.
Figure 17:
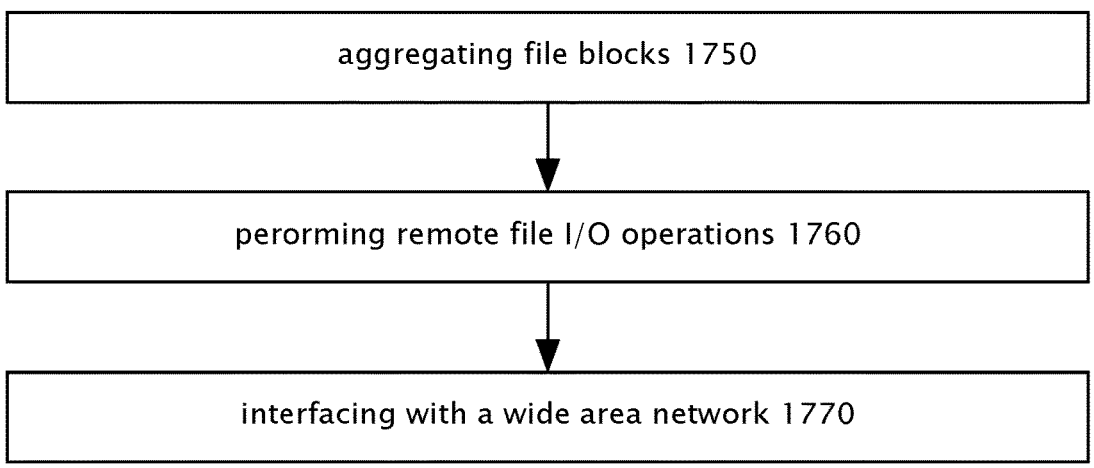

Referring now to FIG. 17 the method of operation of at least one processor performing as: a file block aggregation circuit 1750; coupled to
  a remote file 1/0 circuit 1760; and a wide area network interface 1770 coupled to the remote file 1/0 circuit, whereby many smaller file operations at a remote file server are replaced by fewer but larger file reads and writes.

Figure 18:
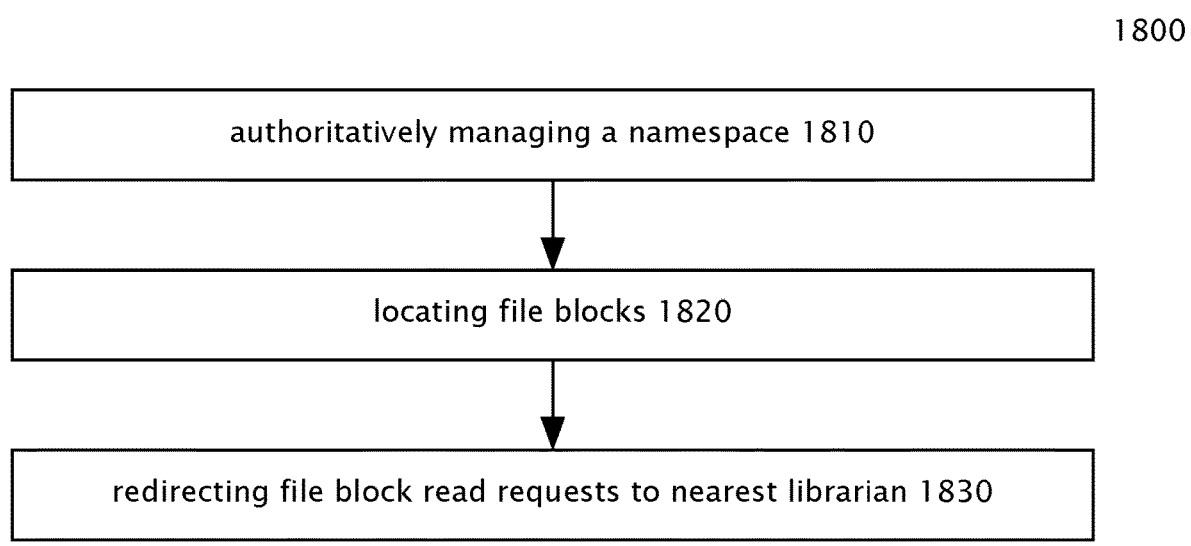
FIG. 18 is a flowchart of method processes to perform as a namespace lord circuit.

Referring now to FIG. 18 the method of operation of at least one processor comprises performing as: a namespace lord circuit 1810; coupled to the file block write/acknowledgement circuit, and said namespace lord circuit further coupled to the remote file 1/0 circuit, a file block locations circuit 1820; coupled to the namespace lord, and a file block read request redirector 1830 coupled to the file block locations circuit, whereby file block requests are forwarded to the nearest librarian when locally found; and whereby a plurality of file block requests are aggregated for transmission to the remote file server according to the requested version of the file.

Figure 19:
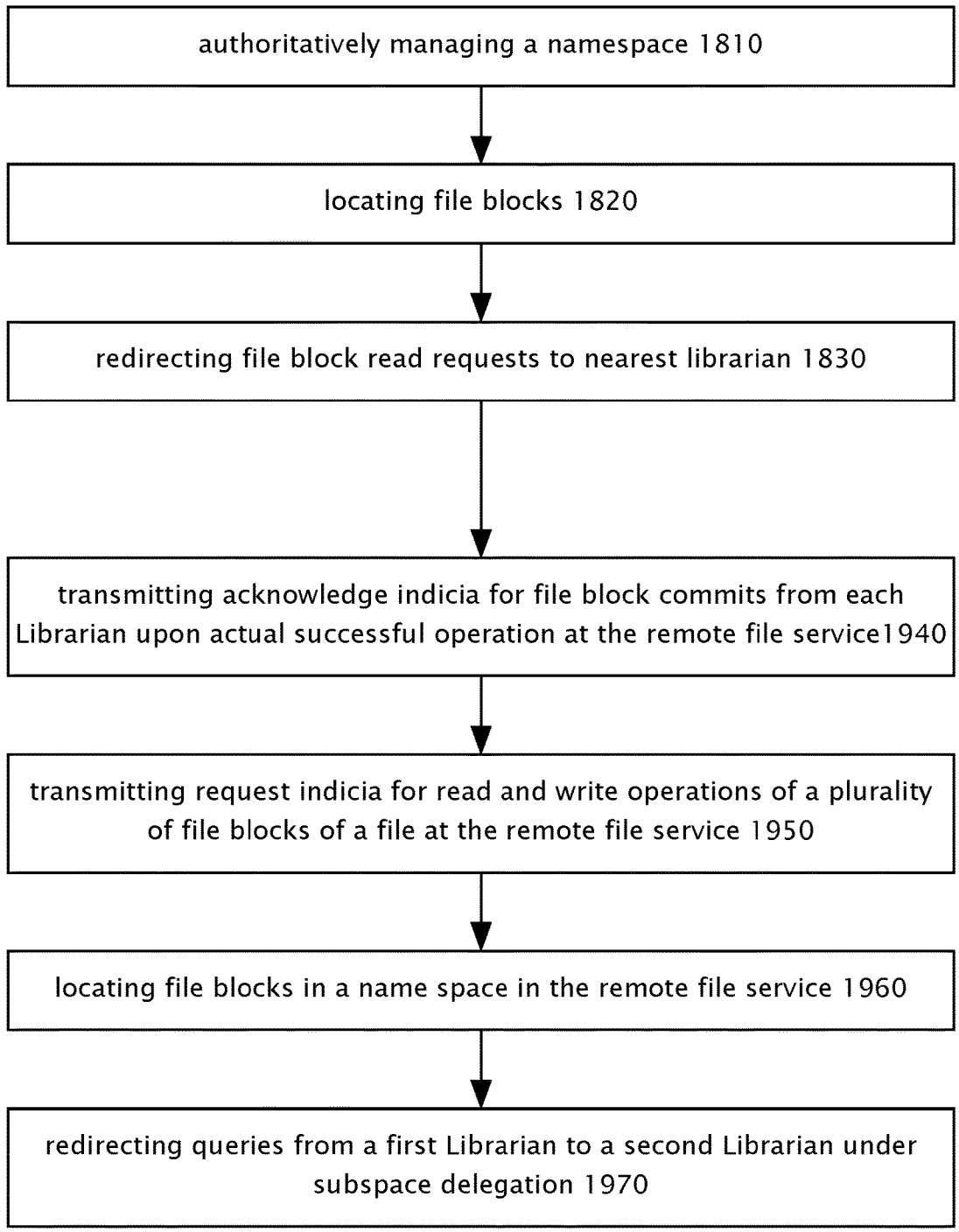
FIG. 19 is a flowchart of method processes to perform as a synch circuit.

Referring now to FIG. 19 the method of operation of at least one processor comprises performing as: a synch circuit 1940 adapted to transmit acknowledge indicia for file block commits from each Librarian circuit upon actual successful operation at the remote file service; a file read/write circuit 1950 to transmit request indicia for read and write operations of a plurality of file blocks of a file at the remote file service; a name space management circuit 1960 to locate file blocks in the remote file service; and a subspace delegation circuit 1970 to redirect queries from a first Librarian to a second Librarian.

Another aspect of the invention for improving performance of a file system in writing to multi-disk non-transitory storage is illustrated in a flowchart of method processes of FIG. 20: receiving 2010, from a processor core, a plurality (e.g. 4) of file block variant commit request indicia into non-transitory media (store) for various file extents of a version controlled file; storing 2020 said plurality of file extents until a threshold of parallelism is exceeded; transmitting 2030 an acknowledge indicia for a file commit to a sender of file block variant commit request; incrementing the number of file block variant commit request indicia yet unfulfilled for the version controlled file (C) 2040; comparing C to a threshold 2050 (wherein said threshold reflects efficiency in exploiting parallelism in a multi-disk array); upon exceeding said threshold (e.g. 4) of C (unfulfilled file block variant commit requests), triggering a file write operation for all stored file extents of the version controlled file into a remote multi-disk non-transitory media (remote store) 2060; and reinitializing C the number of received file block variant commit request indicia 2070.

When several file block variants are committed by applications running in virtual machines, they are aggregated together into a fewer number of file write operations to exploit the parallelism of multi-disk arrays. Aggregation is provided for file block variants of a plurality of files and a plurality of versions. The Tracker apparatus receives requests for file blocks when a File Block Librarian cannot locate the requested version. The Tracker consolidates multiple file block reads or file block variant writes to minimize disk accesses of the conventional file system. The Tracker distributes file blocks received from conventional file system to the requesting file block Librarians and maintains a directory for future requests.

An application within a virtual machine may be released without risk of data loss as soon as the commitment has been acknowledged. Requests for frequently retrieved file block variants are redirected to the location of the freshest retention. A file system view is presented to each virtual machine so that it may operate on any version of any file block.

Each File Block Librarian (FBL) presents a Filesystem View Port (FVP) to its client virtual machines. In an embodiment, this is done by IPC. The virtual machines request read or write access via its FVP. If the virtual machine is writing file blocks, its FVP diverges from other FVPs but any change may be discarded without being propagated to the cloud storage service.

Each data center has a non-transitory file block store locally attached which provides images of virtual machines, applications, and data.

When a virtual machine is popped open in a processor core of a first virtual machine data center, it requests a Filesystem View Port of files in a namespace from its locally attached File Block Librarian apparatus. Virtual Machine images, User Application images, and data files are provisioned to each processor core by the File Block Librarian apparatus. In an embodiment, the File Block Librarian may be implemented in another virtual machine on a processor core.

Several Virtual Machine Data Centers are coordinated by a Tracker apparatus which manages all the assets in a name space.

A conventional file system is coupled to many virtual machine datacenters by a File Block Tracker apparatus (Tracker) which is coupled to a plurality of File Block Librarian apparatuses.

Each data center has a file block Librarian which provides a file system view to each virtual machine.

Each first File Block Librarian apparatus has non-transitory file block storage and is communicatively coupled to at least one second File Block Librarian apparatus so that a requested file block may be provided from a first or a second non-transitory file block storage.

A Tracker locates, redirects, and retrieves any file block within its namespace. The capabilities of the tracker apply to any file in its namespace, any version of any file in its namespace, any file block of any version, and can support multiple files and multiple versions simultaneously.

When committed into the file system, other virtual machines may access the new variant via one or more File Block Librarians. That is, file blocks committed into one File Block Librarian may be accessible via other communicatively coupled File Block Librarians (FBL). When a FBL fulfills a request for a file block access it retains a copy for subsequent requests from other virtual machines. The FBLs which are typically geographically clustered gossip among themselves exchanging FVP information.

A File Block Tracker (FBT) consolidates file access requests from a group of File Block Librarians (FBL) and prosecutes them through a cloud storage service to a File System server. Because of the parallelism utilized by modern file servers, multiple file block read requests may be fulfilled in nearly the same wall clock time as a single file block read or write request in the same file.

The File Block Tracker may operate in semi-synch or full synchronized mode. In fully synchronized mode, every change committed to any File Block is propagated from a Librarian to the Tracker. Upon acknowledgement, the operations at the virtual machine proceeds. This is the most costly but guarantees data integrity. In semi-synchronized mode, a tracker aggregates several file block writes, stores them to non-transitory media, and acknowledges to the application. In subspace delegation this function and control over a subspace is delegated to a Librarian. Updates to file blocks is eventually passed to the Tracker but the focus is on reads over writes. There is vulnerability to data loss if there is a crash of the Librarian which has been delegated subspace authority.

The File Block Tracker assists in exchanging Filesystem View Ports among File Block Librarians which are not directly communicatively connected. Each Tracker defines a namespace for files. A Librarian may talk to multiple Trackers and be redirected to another Librarian for a desired file block. In an embodiment, another processor or processor core may also host the File Block Librarian.

In embodiments of the invention, various thresholds of parallelism are determined from the dimensions of a multi-disk array. Examples include the number of disk head actuators or diskheads in the array (Dna), one less than Dna, two less than Dna, and an integer of a multiple of a logarithm of Dna. Embodiments of the invention include:

A computer-implemented method of operation for at least one processor to operate as a versioned file block location tracker (tracker) apparatus for intermediation between a plurality of librarian circuits and a remote file server the method comprising: receiving, from a processor core via a local network interface, a plurality of file block commit request indicia into a non-transitory media (Cohort Store) for various file extents of a version controlled file;

transmitting an acknowledge indicia for a file commit to a sender of file block commit request, by means of a file block write/acknowledgement circuit coupled to the local network interface; and storing said plurality of file extents until a threshold of parallelism is exceeded into a local non-transitory store coupled to the file block write/acknowledgement circuit, whereby throughput of virtual machines attached to the librarian circuits is improved by releasing the resources for reuse as soon as a write acknowledgement is received by the librarian, wherein said threshold of parallelism is a function of a number of parallel disk head actuators in a multi-disk array (Dna).

In an embodiment, the method includes performing:

incrementing a count of file block commit request indicia yet unfulfilled for the version controlled file (Cohort Count);

and upon exceeding said threshold of parallelism f(Dna) by Cohort Count (C) of unfulfilled file block commit requests, triggering a file write operation, according to ranks of parallelizable execution and regardless of order of reception into the Cohort Store, for all stored file extents of the version controlled file (Cohort Store) into a remote multi-disk non-transitory media (remote store) and reinitializing C the count of received file block commit request indicia, whereby file operations at a remote file server are improved by fewer but larger file reads and writes.

In an embodiment, the function [f(Dna)] of the number of parallel disk head actuators (diskheads) in a multi-disk array is an integer multiple of the integer of a logarithm of the number of diskheads [n*Integer[log Dna]].

In an embodiment, the function [f(Dna)] of the number of parallel disk head actuators (diskheads) in a multi-disk array is two less than the number of diskheads (Dna−2). In an embodiment, the function [f(Dna)] of the number of parallel disk head actuators (diskheads) in a multi-disk array is one less than the number of diskheads (Dna−1). In an embodiment, the function [f(Dna)] of the number of parallel disk head actuators (diskheads) in a multi-disk array is equal to the number of diskheads [f(Dna)=Dna].

In an embodiment the invention further comprises performing as:

a namespace lord circuit; coupled to the file block write/acknowledgement circuit and further coupled to the remote file I/0 circuit, a file block locations circuit; coupled to the namespace lord, and a file block read request redirector coupled to the file block locations circuit, whereby file block requests are forwarded to the nearest librarian or to the remote file server according to the requested file version.

In an embodiment, the invention provides a method for improving performance of a file system in writing to local multi-disk non-transitory storage array independent of a FIFO transmission channel comprising the processes:

receiving a file extent write operation from a sender;

writing the file extent into a Cohort Store;

acknowledging the file extent write operation to the sender;

incrementing a Cohort Count;

starting a max wait timer when Cohort Count equals 1;

storing an integer for a number of parallel disk heads in a Multi-Disk Array as Dna;

determining when Cohort Count exceeds Dna;

determining when Cohort Count exceeds Dna minus 1;

determining when Cohort Count exceeds Dna minus 2;

setting Z equal to an integer of a multiple of the logarithm of Dna; (e.g integer of thrice the logarithm of 65 3×6.fraction=18);

determining when Cohort Count exceeds Z;

triggering a write operation to Multi-Disk Array when max wait timer expires; and resetting the Cohort Count to zero upon successful writing all contents of the Cohort Store to the Multi-Disk Array.

In an embodiment, the method includes on the condition when Cohort Count (CC) exceeds number of parallel disk heads is TRUE [(CC>Dna)=TRUE]; further comprising:

performing as many disk write operations in parallel as possible until all contents of the Cohort Store have been processed; and resuming the process.

In an embodiment, the method includes on the condition when Cohort Count (CC) exceeds number of parallel disk heads minus 1 is TRUE [(CC>Dna−1)=TRUE]; further comprising:

determining a first rank of file extent write operations which maximize parallelism in disk utilization;

performing as many disk write operations in parallel as possible until all contents of the Cohort Store have been processed; and resuming the process.

In an embodiment, the method includes on the condition when Cohort Count (CC) exceeds number of parallel disk heads minus 2 is TRUE [(CC>Dna−2)=TRUE]; further comprising:

determining the disk heads with most file extent write operations and scheduling the order of operation to optimize disk head movement;

determining a first rank of file extent write operations which maximize parallelism in disk utilization;

performing as many disk write operations in parallel as possible until all contents of the Cohort Store have been processed; and resuming the process.

In an embodiment, the method includes on the condition when Cohort Count (CC) exceeds Z is TRUE [(CC>Z)=TRUE]; further comprising: determining successor file extents write operations in Cohort Store which will overwrite predecessor file extent write operations and deleting the predecessors;

determining the disk heads with most file extent write operations and scheduling the order of operation to optimize disk head movement;

determining a first rank of file extent write operations which maximize parallelism in disk utilization;

performing as many disk write operations in parallel as possible until all contents of the Cohort Store have been processed; and resuming the process.

CONCLUSION

The present patent application can be easily distinguished from Ofek 5889935 which teaches away from the present invention for improving efficiency for parallel disk arrays by initiating a copy task whenever it detects "invalid tracks" in the index table. Ofek 5889935 further suggests in step 406 "Preferably, tasks suspended while waiting for completion of a pending remote write are placed on a first-in first-out (FIFO) queue of suspended tasks, and when the remote data storage system acknowledges completion of the pending remote write, any waiting tasks in queue of suspended tasks are serviced in the order in which the tasks were placed in the queue." Ofek teaches away from improving parallel efficiency in multi-disk array by " . . . Next, in step 415, the write data from the host is written to a first-in, first-out (FIFO) link transmission queue (504 in FIG. 18) for transmission by a link adapter to the remote data storage system"

In Ofek's discussion of FIGS. 7 and 8, multiple entries are placed in the FIFO link queue. Which clearly teaches to sequential and against parallel operations.

Ofek defines a term "skew" as a count of write pending operations, however "When data transfers begin, such a remotely mirrored pair operates in the adaptive copy—write pending mode until "bursts" of high write activity cause the number of write pending operations to exceed the low skew value, and the remotely mirrored pair is forced to the pre-determined synchronous or semi-synchronous mode. When the number of write pending operations for the secondary (R2) volume drops below the skew value, the remotely mirrored pair returns to the adaptive copy—write pending mode. Any new writes for the pair accumulate in cache as write pendings. Synchronization will occur when the remotely mirrored pair switches to the pre-determined synchronous or semi-synchronous mode.

Ofek teaches the skew value to be user-configurable with a range of 1 to 999,999.

"The adaptive copy—disk mode uses the user-configurable skew parameter (maximum invalid tracks), that, when its value is exceeded for a remotely mirrored volume pair, causes the mode to switch to the pre-determined synchronous or semi-synchronous mode for the remotely volume mirrored pair. (Therefore, in any case, all write operations between the remotely mirrored volumes are fully synchronized.) When the number of invalid tracks for a secondary (R2) volume goes below the value specified by the skew parameter, the operating mode switches back to the adaptive copy disk mode for that volume pair. The skew value, for example, may range from 1 to 999,999, and the default value is the maximum value of 999,999."

Applicant explicitly relates a threshold of parallelism to the number of diskheads in a multi-disk array. If Ofek teaches a default value of 999,999 it cannot be seriously thought to support a one million disk array. And by forcing his operating mode into fully synchronized, he initiates potentially nearly one million sequential write operations.

The present patent application may be easily distinguished from Ofek 5889935 which teaches away from optimizing parallelism by referring to FIFOs in FIGS. 7 and 8, defines a user-configurable parameter "skew" without regard to the number of diskheads in a multi-disk array, and advocates initiating a copy task upon discovering any "invalid tracks" in his index table. Applicant's invention is directed to improving the efficiency and performance of multi-disk storage arrays by performing file extent write operations in parallel unlike Ofek which cannot serve as a reference in whole or in part. The present patent application can be easily distinguished by determining an integer multiple of a logarithm of the number of diskheads in a multi-disk array as a threshold for triggering parallel write operations from a Cohort Store regardless of the order of reception of file block commit requests. The present invention is easily distinguished from conventional file versioning software by the paralleling step for committing file block variants into a file system in one of synchronous mode or semi-synch mode by a namespace tracker. The present invention is easily distinguished by subspace delegation of portions of a name space by the tracker apparatus to a data center specific file block librarian. The present invention is easily distinguished by enabling resources or virtual machines to be released upon a file commit acknowledgement by a tracker.

In an embodiment, the invention comprises a computer-implemented method of operation for at least one processor to operate as a versioned file block location tracker (tracker) apparatus for intermediation between a plurality of librarian circuits and a remote file server the method including the processes: receiving, from a processor core via a local network interface, a plurality of file block variant commit request indicia into a non-transitory media (store) for various file extents of aversion controlled file; transmitting an acknowledge indicia for a file commit to a sender of file block variant commit request, by means of a file block write/acknowledgement circuit coupled to the local network interface; and storing said plurality of file extents until a threshold of parallelism is exceeded into a local non-transitory store coupled to the file block write/acknowledgement circuit, whereby throughput of virtual machines attached to the librarian circuits is improved by releasing the resources for reuse as soon as a write acknowledgement is received by the librarian.

In an embodiment, the method of operation also includes performing:

incrementing a count of file block variant commit request indicia yet unfulfilled for the version controlled file; and upon exceeding a threshold of C unfulfilled file block variant commit requests, triggering a file write operation for all stored file extents of the version controlled file into a remote multi-disk non-transitory media (remote store) and reinitializing C the count of received file block variant commit request indicia, whereby file operations at a remote file server are improved by fewer but larger file reads and writes.

The techniques described herein can be implemented in digital electronic circuitry, or in computer hardware, firmware, software, or in combinations of them. The techniques can be implemented as a computer program product, i.e., a computer program tangibly embodied in non-transitory media, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, byway of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Information carriers suitable for embodying computer program instructions and data include all forms of non-volatile memory, including byway of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

An Exemplary Computer System

FIG. 1 is a block diagram of an exemplary computer system that may be used to perform one or more of the functions described herein. Referring to FIG. 1, computer system 100 may comprise an exemplary client or server computer system. Computer system 100 comprises a communication mechanism or bus 111 for communicating information, and a processor 112 coupled with bus 111 for processing information. Processor 112 includes a microprocessor, but is not limited to a microprocessor, such as for example, ARM™, Pentium™, etc.

System 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor 112.

Computer system 100 also comprises a read only memory (ROM) and/or other static storage device 106 coupled to bus 111 for storing static information and instructions for processor 112, and a non-transitory data storage device 107, such as a magnetic storage device or flash memory and its corresponding control circuits. Data storage device 107 is coupled to bus 111 for storing information and instructions.

Computer system 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a wireless network 125 for communicating selections and command and data input to processor 112.

Note that any or all of the components of system 100 and associated hardware may be used in the present invention. However, it can be appreciated that other configurations of the computer system may include some or all of the devices in one apparatus, a network, or a distributed cloud of processors.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A computer-implemented method of operation for at least one processor to operate as a versioned file block location tracker (tracker) apparatus for intermediation between a plurality of librarian circuits and a remote file server, the method comprising:
   receiving, from a processor core via a local network interface, a plurality of file block commit request indicia into a non-transitory media for various file extents of a version controlled file;
   storing said plurality of file extents into a local non-transitory store coupled to the file block write/acknowledgement circuit;
   transmitting an acknowledge indicia for a file commit to a sender of file block commit request, by means of a file block write/acknowledgement circuit coupled to the local network interface;
   incrementing a number of unfulfilled file block commit requests of file block commit request indicia yet unfulfilled for the version controlled file;
   upon exceeding a threshold of parallelism of a count of unfulfilled file block commit requests, triggering a file write operation, according to ranks of parallelizable execution and regardless of order of reception into the non-transitory media store, for all stored file extents of the version controlled file into a remote multi-disk non-transitory media; and
   reinitializing the count of the number of unfulfilled file block commit request indicia, whereby throughput of virtual machines attached to the librarian circuits is improved by releasing a resource for reuse as soon as a write acknowledgement is received by the librarian, wherein the threshold of parallelism is a function of a number of parallel disk head actuators in a multi-disk array (Dna), wherein a function [f(Dna)] of the number of parallel disk head actuators in the multi-disk array is an integer multiple of an integer of a logarithm of the number of parallel disk head actuators [n*Integer(log Dna)], and
   whereby data at a primary (R1) volume are synchronized with data at a secondary (R2) volume.

2. The method of claim 1, wherein the function [f(Dna)] of the number of parallel disk head actuators in the multi-disk array is two less than the number of parallel disk head actuators.

3. The method of claim 1, wherein the function [f(Dna)] of the number of parallel disk head actuators in the multi-disk array is one less than the number of parallel disk head actuators.

4. The method of claim 1, wherein the function [f(Dna)] of the number of parallel disk head actuators in the multi-disk array is equal to the number of parallel disk head actuators.

5. The method of claim 1 further comprises performing as:
   a namespace lord circuit; coupled to the file block write/acknowledgement circuit and further coupled to the remote file I/O circuit,
   a file block locations circuit; coupled to the namespace lord circuit, and a file block read request redirector coupled to the file block locations circuit, whereby file block requests are forwarded to the nearest librarian or to the remote file server according to the requested file version.

* * * * *